N. JOHNSON.
FLUME JOINT.
APPLICATION FILED JUNE 5, 1911.
1,018,828.
Patented Feb. 27, 1912.
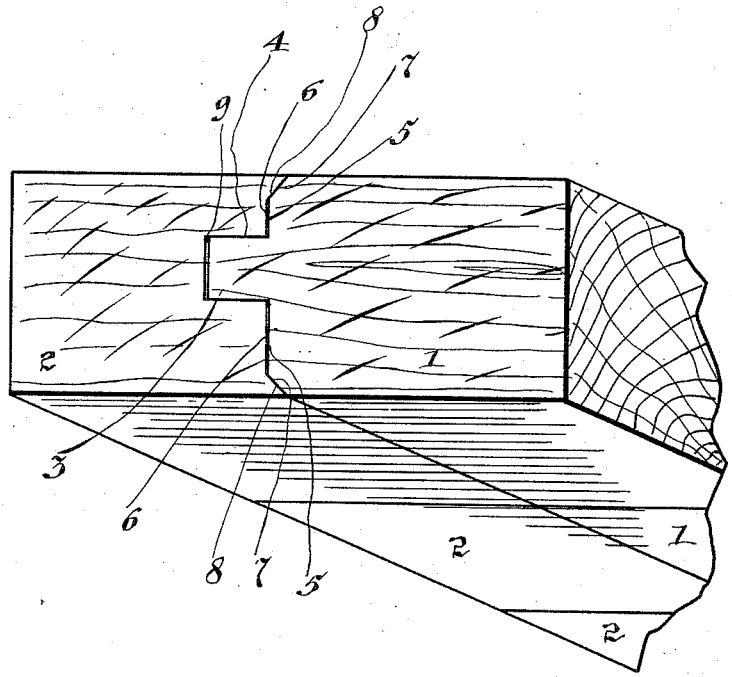
Witnesses
W. E. Smith
B. G. Richards
Inventor
Nels Johnson
by Joshua H. Potts
his Attorney

UNITED STATES PATENT OFFICE.

NELS JOHNSON, OF BATAVIA, ILLINOIS.

FLUME-JOINT.

1,018,828.  Specification of Letters Patent.  Patented Feb. 27, 1912.

Application filed June 5, 1911. Serial No. 631,431.

*To all whom it may concern:*

Be it known that I, NELS JOHNSON, a citizen of the United States, and a resident of the city of Batavia, county of Kane, and State of Illinois, have invented certain new and useful Improvements in Flume-Joints, of which the following is a specification.

My invention relates to improvements in joints especially adapted for the abutting or contiguous ends of sections of flumes, pen-stocks, and other conduits, the object of the invention being the provision of a joint of this character which shall be proof against leakage regardless of the water or other fluid pressure in the conduit.

A further object of my invention is to provide a joint in a wood conduit which shall be simple of design and efficient in operation.

Other objects will appear hereinafter.

With these objects in view my invention consists in the novel construction and arrangement of parts hereinafter described and claimed.

My invention will be best understood by reference to the accompanying drawing forming a part of this specification and in which the figure is a perspective view of a portion of a conduit embodying my invention.

The preferred form of construction of my invention as illustrated in the accompanying drawing comprises an end 1 of a section of a wood flume or conduit and an end 2 of a similar section arranged in alinement with section 1 as clearly illustrated. The joint between the abutting or contiguous ends 1 and 2 comprises a medial tongue 3 projecting from the end 1 and a medial groove 4 formed in the end 2 for the reception of the tongue 3. Shoulders 5 which are disposed transversely of the ends 1 and perpendicular to the tongue 3 are adapted to abut similar shoulders 6 formed in the ends 2. Thus far the construction is similar to that of matched boards in common use for building purposes. The section ends 1 are provided with beveled edges 7 which are the connecting surfaces between the shoulders 5 and the exterior and interior surfaces of the conduit. Formed at an angle corresponding with the beveled edges 7 and adapted to abut the same are flanges 8 which project from the ends 2 as clearly illustrated. The angle of the beveled edges 7 and the corresponding surfaces of the flanges 8 is preferably forty-five degrees but any other suitable angle may be employed. The joint is so formed that when assembled as shown considerable space as at 9 intervenes between the end of the tongue 3 and the bottom of the groove 4. There may also be a space between the shoulders 5 and 6, but these shoulders are adapted to abut when the ends 1 and 2 are subjected to extreme longitudinal pressures. It is apparent that if the space between the shoulders 5 and 6 is too great when the ends 1 and 2 are forced together said ends 2 would split at the bases of the flanges 8, hence only sufficient space is provided between the shoulders 5 and 6 to insure that a better joint is formed between the beveled edges 7 and flanges 8, than between said shoulders 5 and 6. Even after the shoulders 5 and 6 are brought into contact there still is a space between the tongue 3 and the bottom of the groove 4, a tight fitting joint at this point not being so essential as between the beveled edges 7 and flanges 8. This joint is highly efficient partly due to the numerous corners formed therein, it being well known that a corner in the surface is more effective in preventing leakage than contacting level surfaces. It also provides a connection which is firm and rigid, preventing the rocking of the members one upon the other, and also saves the interior of the joint against rotting by providing a tight joint at the outer edges thereof.

A joint of the construction set forth is highly efficient in flumes and pen-stocks and other conduits, and due to the cheapness of construction is particularly desirable for this purpose.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having described my invention what I claim as new and desire to secure by Letters Patent is:

1. A joint of the character described, comprising contiguous ends of flume sections, there being a tongue on one end and a corresponding groove on the other spaced part at the bottom of the groove, the portions of said sections adjacent said tongue and groove being perpendicular to said tongue and substantially tight, the outer portions of said sections being beveled to fit each other and to make a substantially watertight joint therebetween, substantially as described.

2. A joint of the character described, having the tongue 3 on one section interfitting the groove 9 on a contiguous section of a flume, the substantially abutting surfaces 5 and 6, and the tightly fitting beveled surfaces 7 and 8, substantially as described.

In testimony whereof I have signed my name to this specification in the presence of two subscribing witnesses.

NELS JOHNSON.

Witnesses:
HELEN F. LILLIS,
JOSHUA R. H. POTTS.

Copies of this patent may be obtained for five cents each, by addressing the "Commissioner of Patents, Washington, D. C."